United States Patent
Hayasaka et al.

(10) Patent No.: US 9,875,562 B2
(45) Date of Patent: Jan. 23, 2018

(54) VEHICLE INFORMATION DISPLAY DEVICE AND VEHICLE INFORMATION DISPLAY METHOD

(71) Applicant: TOYOTA JIDOSHA KABUSHIKI KAISHA, Toyota-shi, Aichi-ken (JP)

(72) Inventors: Shoichi Hayasaka, Atsugi (JP); Yoshiyuki Hatakeyama, Fuji (JP); Edgar Yoshio Morales Teraoka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 432 days.

(21) Appl. No.: 14/571,871

(22) Filed: Dec. 16, 2014

(65) Prior Publication Data

US 2015/0187110 A1    Jul. 2, 2015

(30) Foreign Application Priority Data

Dec. 27, 2013    (JP) ................. 2013-272496

(51) Int. Cl.
*G09G 5/00*    (2006.01)
*G06T 11/60*    (2006.01)
(Continued)

(52) U.S. Cl.
CPC .............. *G06T 11/60* (2013.01); *B60K 35/00* (2013.01); *B60R 1/00* (2013.01); *G06T 19/006* (2013.01);
(Continued)

(58) Field of Classification Search
CPC ........ B60R 2300/305; B60R 2300/308; B60R 2300/205; B60R 1/00; G06T 2215/16;
(Continued)

(56) References Cited

U.S. PATENT DOCUMENTS

| 7,940,285 | B2* | 5/2011 | Would | G06F 3/0482 345/629 |
| 2003/0083790 | A1* | 5/2003 | Hattori | G06K 9/00651 701/1 |
| 2011/0128139 | A1* | 6/2011 | Tauchi | B60K 35/00 340/439 |

FOREIGN PATENT DOCUMENTS

| JP | 2000-057491 A | 2/2000 |
| JP | 2007087337 A | 4/2007 |

(Continued)

OTHER PUBLICATIONS

Narzt et al., Augmented reality navigation systems, Dec. 2005, Springer-Verlag, 177-187.*

(Continued)

*Primary Examiner* — Robert Craddock
(74) *Attorney, Agent, or Firm* — Sughrue Mion, PLLC

(57) ABSTRACT

A vehicle information display device including: a subject detecting sensor, that detects a first object positioned in a surrounding area of the vehicle and a second object different from the object; a display portion, that has a display area that displays an object mark corresponded to the object to emphatically display the object detected by the subject detecting sensor, and displays the second object mark so that when a number of the second objects that are in the vicinity of the detected first object and are detected by the subject detecting sensor is large, the emphasizing degree of the vertical component of the second object mark is suppressed in comparison with the emphasizing degree of the vertical component of the first object mark when the number of the second objects is small or no second object is detected.

11 Claims, 8 Drawing Sheets

(51) Int. Cl.
*G06T 19/00* (2011.01)
*B60K 35/00* (2006.01)
*B60R 1/00* (2006.01)
*G08G 1/16* (2006.01)

(52) U.S. Cl.
CPC ............ *G08G 1/163* (2013.01); *G08G 1/166* (2013.01); *B60R 2300/205* (2013.01); *B60R 2300/305* (2013.01); *B60R 2300/308* (2013.01); *G06T 2207/30252* (2013.01); *G06T 2215/16* (2013.01)

(58) Field of Classification Search
CPC .......... G06T 2207/30252; G06T 11/60; B60K 35/00; G08G 1/166
See application file for complete search history.

(56) References Cited

FOREIGN PATENT DOCUMENTS

| | | |
|---|---|---|
| JP | 2010-006267 A | 1/2010 |
| JP | 2011-119917 A | 6/2011 |

OTHER PUBLICATIONS

Bell et all, View Management for Virtual and Augmented Reality, Nov. 2001, 101-110.*
Biocca et al., Attention Funnel: Omnidirectional 3D Cursor for Mobile Augmented Reality Platforms, Apr. 27, 2006, 1115-1122.*
Julier et al., Information Filtering for Mobile Augmented Reality, Dec. 2000, 3-11.*

* cited by examiner

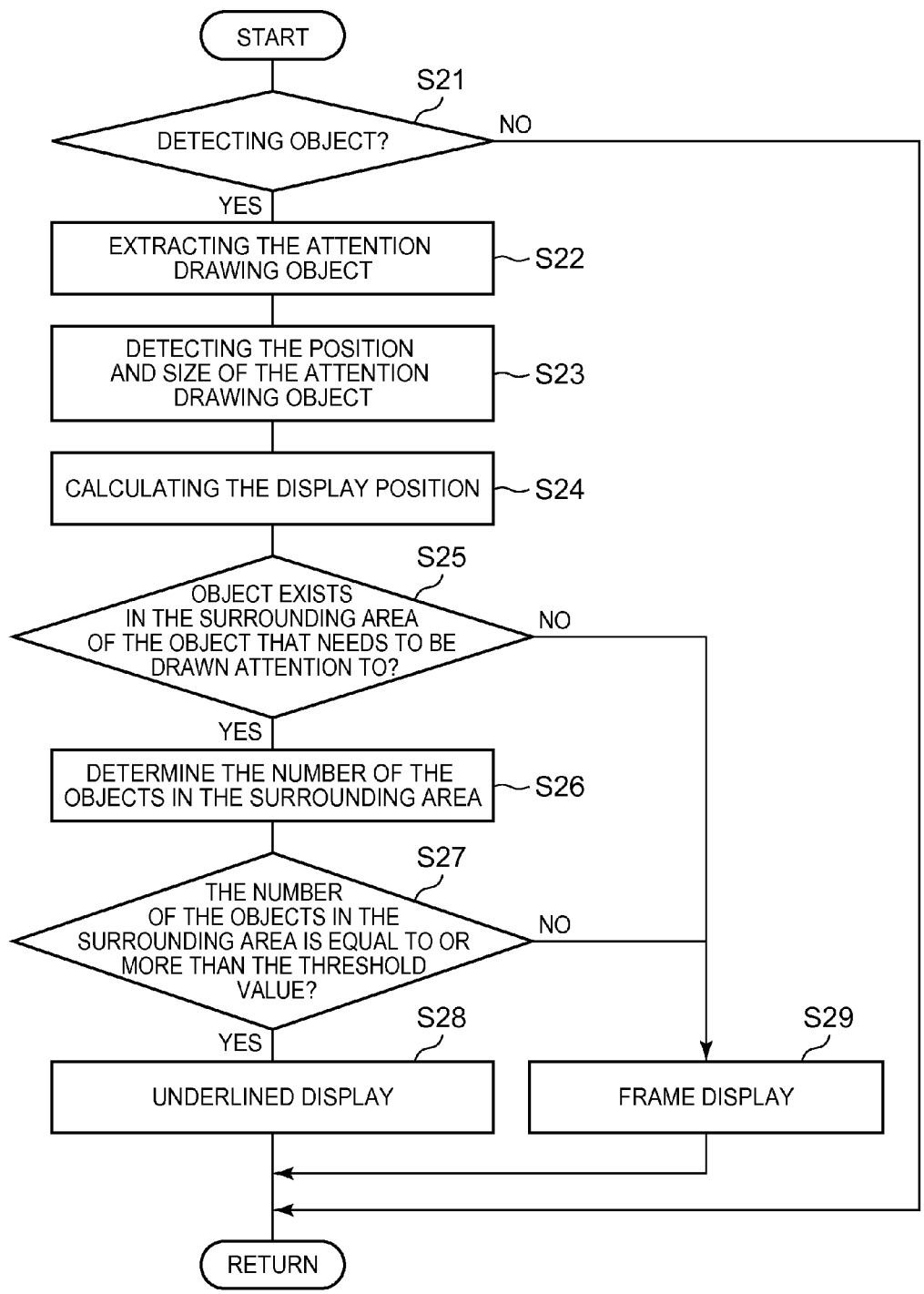

VEHICLE INFORMATION DISPLAY DEVICE AND VEHICLE INFORMATION DISPLAY METHOD

INCORPORATION BY REFERENCE

The disclosure of Japanese Patent Application No. 2013-272496 filed on Dec. 27, 2013 including the specification, drawings and abstract is incorporated herein by reference in its entirety.

BACKGROUND OF THE INVENTION

1. Field of the Invention present invention relates to a vehicle information display device and vehicle information display method for displaying information of an object existing in a surrounding area of a vehicle.

2. Description of Related Art

A vehicle information display device is a device that detects an object existing in the surrounding area of a vehicle and displays information of the object. Japanese Patent Application Publication No. 2010-6267 (JP 2010-6267 A) discloses a vehicle display device including a vehicle-outside information processing portion that acquires position information of an object, such as an obstacle in the front. In the vehicle display device, emphatic display of the object is performed in a front window shield by displaying an object mark and establishing a correspondence between the detected object and the object mark. As the object mark, it may be a dot pattern overlapped and displayed on the detected object or a rod-like pattern displayed below the detected object. By emphatically displaying the object with the object mark such as the dot pattern or the rod-like pattern, the existence of the object can be transmitted to the driver of the host vehicle reliably to draw the attentions.

However, as aforesaid, the situation of performing emphatic display by displaying a frame-like object mark that surrounds the object is different from the situation of performing emphatic display by displaying a dot pattern or a rod-like object mark below the object. Since the display surrounding the object is performed not only from below, but also using vertical frames from both sides of the lateral direction, which are display components extending in the vertical direction (thereafter refers to as the vertical direction component of the object mark), the correspondence between the object mark and the object is stronger.

However, when the driver stares at the object, due to the reasons that there is a perspective difference between the distance between the driver's eyes and the object and the distance between the driver's eyes and the display area and the driver's two eye balls are lined up in the lateral direction, the focus position is easily to deviate in the lateral direction and the vertical direction component of the object mark is easily to blur in the lateral direction. Therefore, in the method of surrounding the object with a frame-like object mark, when a large number of other objects exist in the vicinity of the object expected to be emphasized by displaying a frame, the object mark that displayed corresponding to the expected object will blur, resulting in that the other objects may enter into the inner side of the vertical direction component of the object mark (vertical line of the frame), or the vertical direction component of the object mark (vertical line of the frame) overlaps with other objects, or the vertical direction component of the object mark interferes with other objects, thus, it may be possible to not able to recognize the correspondence between the object mark and the object.

Therefore, the problem is: it is hard to know the object mark shows which object when there is a plurality of objects lined up in the lateral direction. That is, although it is intended to display an object mark only for the object that needs to be drawn attention to, when there is a plurality of objects lined up in the lateral direction, it is hard to recognize the object mark shows which object, thus, the problem possibly exists is: it is hard for the driver to recognize the object that really needs to be drawn attention to.

SUMMARY OF THE INVENTION

Therefore, the object of the present invention is to provide a vehicle information display device and vehicle information display method, even there exists a plurality of objects, the driver can easily recognize the object that needs to be drawn attention to.

One aspect of the present invention relates to a vehicle information display device, comprising: an object detecting portion configured to detect an object in a surrounding area of a host vehicle; and a display portion configured to display an object mark corresponded to the object, the display portion includes a display area for displaying the object mark corresponded to the object, so as to perform emphatically display to the object detected by the object detecting, portion, the display portion displays the object mark so that when one or more second objects are detected in the vicinity of a first object detected by the object detecting portion the second objects being different from the first object, and the number of the second objects is large, an emphasizing degree of a vertical component of the object mark is suppressed in comparison with the emphasizing degree of the vertical component of the object mark when the number of the second objects is small or no second object is detected.

However, when the driver of the host vehicle stares at the first object, since sometimes the focus point of driver's eyes, the focus point of driver's eyes related to the object mark displayed in the display area, will deviate in the lateral direction, the object mark blurs in the lateral direction, and the first object may interfere with the second object in the vicinity of the first object. Therefore, in the vehicle information display device of one aspect of the present invention, the display portion suppresses the emphatic display of the vertical direction component of the object mark, the vertical direction being a direction perpendicular to the direction that the focus point of the eyes derivate, when the object detecting portion detects a large number of the second objects in the vicinity of the detected first object, in comparison with that when the number of the second objects is small or no second object is detected. Therefore, even there are a large number of second objects in the vicinity of the first object and the driver of the host vehicle stares at the first object, by suppressing the emphatic display of the vertical component, the correspondence between the object mark and the first object can be easily recognized. Furthermore, in comparison with the emphatic display of the lateral side (lateral lines of the frame) of the object mark, the emphatic display of the lateral side being hard to generate interference with the second object, the emphatic display of the vertical component of the object mark, the emphatic display of the vertical component being easy to generate interference with the second object, is suppressed. Therefore, the interference between the object mark and the second object can be suppressed, and a certain correspondence between the object mark and the first object can be ensured. Therefore, even there is a plurality of other objects in the vicinity of the first object, the correspondence between the object mark and the first object can be easily recognized. And, since the emphatic display of the vertical component can be not suppressed when the number of the second subjects is small or no second object is detected, thus under this situation, the correspondence between the object mark and the first object will not decrease. Therefore, since the driver can easily recognize the first object by the object mark, thus, even there is a plurality of objects, the object that needs to be drawn attention to can be easily recognized.

Furthermore, the display portion may display the object mark so that when the number of the second objects is equal to or more than a predetermined threshold value, the emphasizing degree of the vertical component of the object mark is suppressed in comparison with the emphasizing degree of the vertical component of the object mark when the number of the second objects is below the predetermined threshold value. In this way, the display portion suppresses the emphasizing degree of the vertical component of the object mark when the number of the second objects detected by the object detecting portion is equal to or more than the threshold value, in comparison with that when the number of the second objects is below the threshold value. Therefore, when the number of the second objects is equal to or more than the threshold value, the interference between the object mark and the second object can be suppressed, and meanwhile a certain correspondence between the object mark and the first object can be ensured. Therefore, since the driver can easily recognize the first object by the object mark, thus, even there is a plurality of objects, the driver can easily recognize the object that needs to be drawn attention to.

Furthermore, the shorter a distance between the first object and the second object is, the further the display portion may suppress the emphasizing degree of the vertical component of the object mark to display the object mark. The shorter the distance between the first object and the second object is, the higher the possibility that the object mark corresponded to the first object interferes with the second object, but in the vehicle information display device of one aspect of the present invention, the shorter the distance between the first object and the second object is, the emphasizing degree of the vertical component is further suppressed. Therefore, even the distance between the first object and the second object is short, it is hard for the object mark to interfere with the second object, thus, the situation of being hard to recognize the correspondence between the object mark and the first object can be avoided.

Furthermore, the object mark may also be a frame displayed in the display area, surrounding the first object. In this way, since the frame-like object mark is displayed surrounding the first object, thus, when there is small number of the second objects, the correspondence between the object mark and the first object can be easily recognized.

Furthermore, the object mark may adopt any of the following display modes: the first object mark displayed as a frame in the display area, surrounding the first object, and the second object mark of which the emphasizing degree of the vertical component is suppressed in comparison with the first object mark; the display portion may suppress the emphasizing degree of the vertical component of the object mark by switching the display mode of the object mark from the first object mark to the second object mark. Besides, the object mark may be a frame displayed in the display area, surrounding the first object, the display portion may suppress the emphasizing degree of the vertical component of the object mark by suppressing the emphasizing degree of the vertical frame portions of the frame.

Furthermore, an approaching determining portion may be included to determine whether the first object and the second object are approaching, the display portion may suppress the emphasizing degree of the vertical component of the object mark to display the object mark, when the approaching determining portion determines that the first object and the second object are approaching. By providing the approaching determining portion in such a manner, whether the first object and the second object are approaching is determined, when it is determined that the first object and the second object are approaching, the emphasizing degree of the object mark is suppressed; and when it is determined that the first object and the second object are not approaching, the emphasizing degree of the object mark is not suppressed. In this way, whether or not suppressing the emphasizing degree can be determined according the distance between the objects.

Furthermore, the first object may be an object that needs to be drawn attention to in comparison with the second object. At this situation, the driver can easily recognize the first object, thus, the object that needs to be drawn attention to can also be easily recognized.

Furthermore, the display area may also be provided on a head-up display of a host vehicle. If the display area is provided on the head-up display, information relating to the object is substantially displayed in the sight of the driver. Therefore, since the driver can grasp the object without moving his or her sight, the timing when the driver notices the existence of the object can be advanced.

Furthermore, the display portion may also suppress the emphasizing degree of the vertical component of the object mark when the number of the second objects is equal to or more than the threshold value; and the display portion may not suppress the emphasizing degree of the vertical direction component of the object mark when the number of the second objects is below the threshold value. When the number of the second objects is equal to or more than the threshold value, the emphasizing degree of the vertical component of the object mark, the emphasizing degree of the vertical component being easy to generate interference between the object mark and the second object, is suppressed, by suppressing the emphasizing degree of the vertical component of the object mark. Therefore, interference between the object mark and the second object can be suppressed, and the driver can easily recognize the object that needs to be drawn attention to.

Furthermore, the display portion may suppress the emphasizing degree of the vertical component of the object mark when at least more than one second objects is detected; on the other hand, when no second object is detected, the display portion may not suppress the emphasizing degree of the vertical component of the object mark. By suppressing the emphasizing degree of the vertical component of the object mark when at least one or more second objects are detected, interference between the object mark and the second object can be prevented more reliably, and the driver can easily recognize the object that needs to be draw attention to.

The vehicle information display method that other aspects of the present invention relate to comprising the following steps: detecting object in a surrounding area of a host vehicle; and using a electronic control unit to display an object mark corresponded to the object, the object mark being corresponded to the object to emphatically display the detected object when detecting the object, wherein when the object mark is displayed, the object mark is displayed in a displaying area for displaying the object mark, the object mark is displayed so that when one or more second objects are detected in the vicinity of a detected first object, second objects being different from the first object, and the number of the second objects is large, the emphasizing degree of a vertical component of the object mark is suppressed in comparison with the emphasizing degree of the vertical component of the object mark when the number of the second objects is small or no second object is detected.

In the vehicle information display method of another aspect of the present invention, during displaying, the emphatic display of the vertical direction component of the object mark is suppressed when a large number of second objects in the vicinity of the detected first object is detected, in comparison with that when the number of the second objects is small or no second object is detected. Therefore, even there are a large number of the second objects in the vicinity of the first object and the driver of the host vehicle stares at the first object, the correspondence between the object mark and the first object can be easily recognized by suppressing the emphatic display of the vertical component. Furthermore, in comparison with the emphatic display of the lateral side (lateral lines of the frame) of the object mark, the emphatic display of the lateral side being hard to generate interference with the second object, the emphatic display of the vertical component of the object mark, the emphatic display of the vertical component being easy to generate interference with the second object, is suppressed. Therefore, the interference between the object mark and the second object can be suppressed, and a certain correspondence between the object mark and the first object can be ensured. Therefore, even there is a plurality of other objects in the vicinity of the first object, the correspondence between the object mark and the first object can be easily recognized. Furthermore, since the emphatic display of the vertical component can be not suppressed when the number of the second subjects is small or no second object is detected, thus, at this situation, the correspondence between the object mark and the first object will not decrease. Therefore, since the driver can easily recognize the first object by the object mark, thus even there is a plurality of objects, the object that needs to be drawn attention to can be easily recognized.

Furthermore, during displaying, the object mark may be displayed so that when the number of the second objects is equal to or more than a predetermined threshold value, the emphasizing degree of the vertical component of the object mark is suppressed in comparison with the emphasizing degree of the vertical component of the object mark when the number of the second objects is below the predetermined threshold value. In this way, during displaying, the emphasizing degree of the vertical component of the object mark is suppressed when the number of the second objects detected by the object detecting portion is equal to or more than the threshold value, in comparison with that when the number of the second object is below the threshold value. Therefore, when the number of the second objects is equal to or more than the threshold value, the interference between the object mark and the second object can be suppressed, and meanwhile, the a certain correspondence between the object mark and the first object can be ensured. Therefore, since the driver can easily recognize the first object by the object mark, thus, even there is a plurality of objects, the driver can easily recognize the object that needs to be drawn attention to.

According to the aspects and embodiments of the present invention, even there is a plurality of objects, the driver can easily recognize the object that needs to be drawn attention to.

BRIEF DESCRIPTION OF THE DRAWINGS

Features, advantages, and technical and industrial significance of exemplary embodiments of the invention will be described below with reference to the accompanying drawings, in which like numerals denote like components, and wherein:

FIG. 8 is a flow chart illustrating the vehicle information display process of the modified embodiment.

DETAILED DESCRIPTION OF EMBODIMENTS

Figure 1:
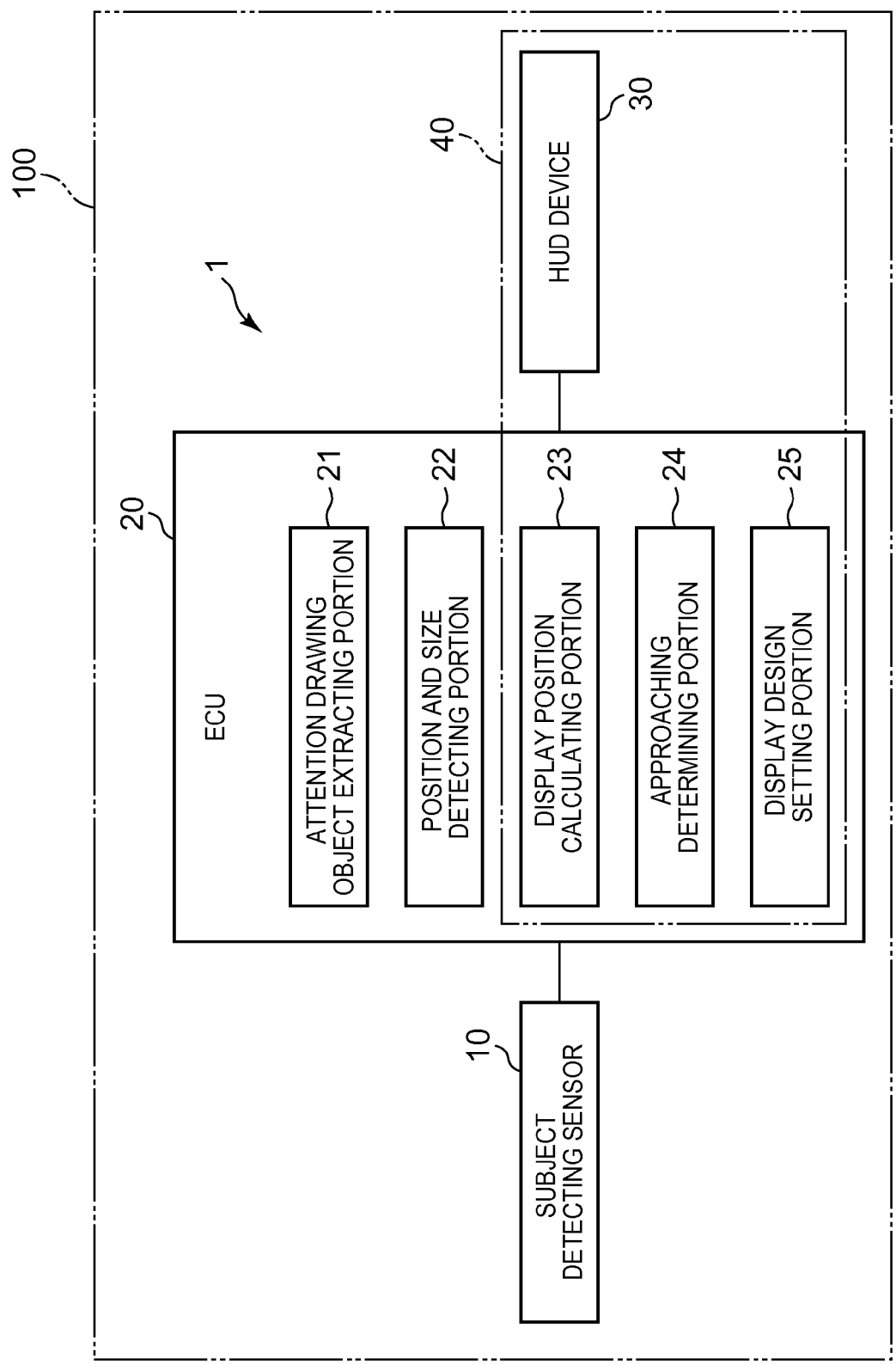
FIG. 1 is a block diagram illustrating the vehicle information display device of the present embodiment.

With reference to the figures, the preferred embodiments of the present invention are described as follows. Furthermore, in the following descriptions, same or corresponding elements are illustrated with the same reference numerals to avoid repetition.

Figure 2:
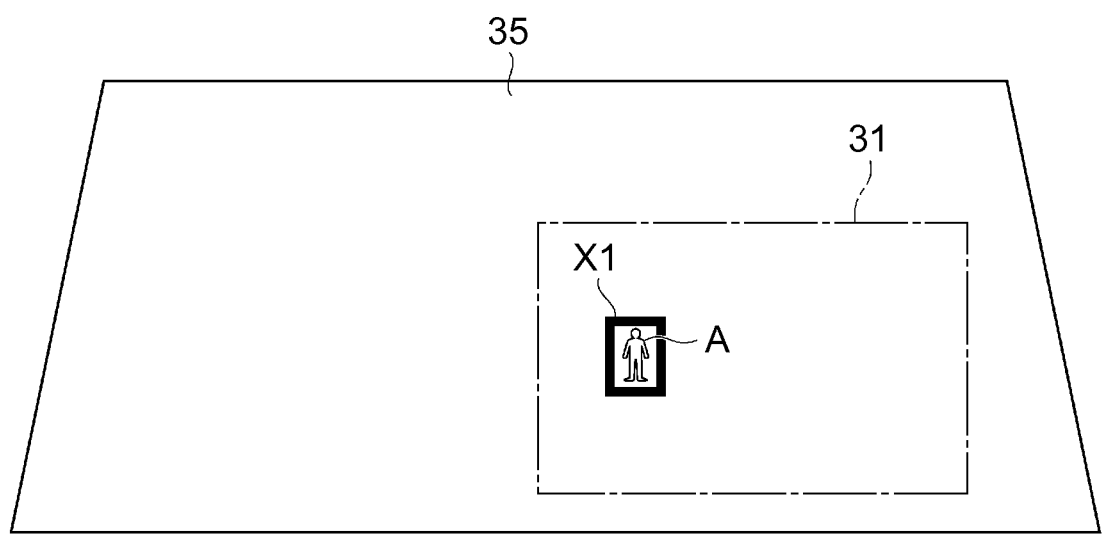
FIG. 2 is a diagram illustrating a display area of the vehicle information display device of FIG. 1.
Figure 3:
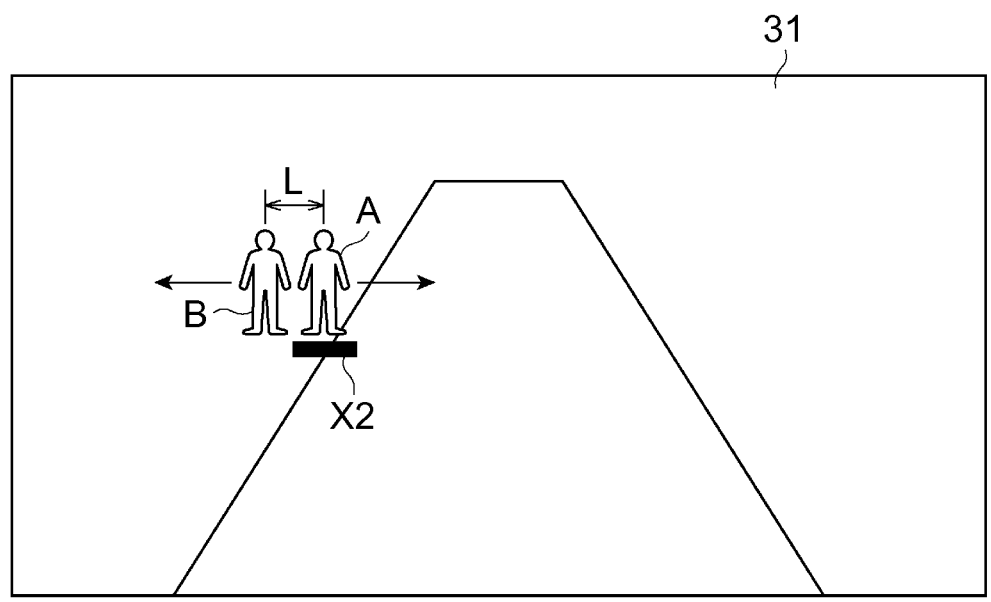
FIG. 3 is a schematic diagram illustrating the display mode of the object mark.

As illustrated by FIG. 1 to FIG. 3, a vehicle information display device 1 of the present embodiment is mounted on a vehicle 100. The vehicle information display device 1 detects an object A (first object) in a surrounding area of the vehicle 100, and displays a first object mark X1 or a second object mark X2 corresponding to the object A in a display area 31 of a HUD (Head-up Display) device 30 that functions as a display system HMI (Human Machine Interface). As the object A in the surrounding area of the vehicle 100, it may be an object having risk, such as a pedestrian, a bicycle, a motorcycle that may collide with the vehicle 100, or other vehicles other than the vehicle 100.

The vehicle information display device 1 includes: a subject detecting sensor (object detecting portion) 10 that is capable of detecting an object A in the surrounding area of a host vehicle which is the vehicle 100, and an object B different from the object A; and a HUD device 30 that displays, in a display area 31, a first object mark X1 or a second object mark X2 corresponding to the object A in order to emphatically display the object A.

Moreover, the object B (the second object) may be a moving subject detected by the subject detecting sensor 10, or an object that has the same risk to the object A, or an object that is of the same category with the object A (for example, both of them are pedestrians). Herein, the so-called object mark is displayed in the display area 31 so as to emphatically display the object A. In the present embodiment, the display area 31 is a display area of the HUD device 30 set at a driving seat side of a front glass 35 when looking at the front from inside of the vehicle 100, and driver of the vehicle 100 can view the display area 31 while driving. Herein, the so-called HUD, which means the head up display, is a display that overlays information at a visual field of the driver of the vehicle 100. As the head-up display, for example, the front glass 35 or a transparent plate provided right before the front glass 35 can be used.

Furthermore, since the object A is positioned at an outer side of the front glass 35 when the driver of the vehicle 100 looks at the object A, the driver can view the object A through the display area 31. Besides, by providing the display area 31 at the driving seat side of the front glass 35, the driver can view the display area 31 easily, and therefore, the visibility of the driver can be increased and a compact display area 31 can be achieved.

When an object B is detected in the vicinity of the object A detected by the subject detecting sensor 10, the HUD device 30 displays, in the display area 31, a second object mark X2 in which the emphasizing degree of a vertical component is suppressed in comparison with that of the first object mark X1. Herein, the so-called emphasizing degree of the object mark means the recognition easiness of the object mark for the driver, including: the color density of the object mark, the thickness of the object mark, the brightness of the object mark, whether the object mark has a color that can be easily recognized, or whether the color of the object mark is a preset color which shows the high risk (such as, red), etc. Furthermore, the so-called suppressing the emphasizing degree means making the object mark difficult to be viewed by the driver, including making the color density of the object mark lighter, or making the object mark narrower, or lowering the brightness of the object mark, such as changing the color of the vertical line of the object mark from "red" to "yellow" to make the object mark difficult to be recognized, or changing the color of the vertical line of the object mark from "red" to "blue" to indicate changing from a color showing high risk to a color showing low risk, etc.

Furthermore, the so-called suppressing the emphasizing degree of the vertical component means making the vertical component of the object mark difficult to be recognized, for example, when the object mark is a frame, by making the color density of the lines extending vertically lighter or by making the lines extending vertically narrower or by lowering the brightness of the object mark, the lines extending vertically are not obvious in comparison with the lines extending laterally. For example, when the object mark is a quadrilateral frame, by making the color density of the lines extending vertically lighter or by making the lines extending vertically narrower or by lowering the brightness of the object mark, the lines extending vertically are not obvious in comparison with the lines extending laterally. For example, when the object mark is a circular frame or an oval frame, by dividing the circular frame or the oval frame into four circular curved portions in the left-right and up-down directions, and making the color density of the circular curve portions extending longer vertically lighter or by making circular curve portions extending vertically narrower or by lowering the brightness of the object mark, the circular curved portions extending longer vertically are not obvious in comparison with the circular curved portions extending longer laterally. Furthermore, for example, by changing the frame-like object mark to other object mark (object marks of lateral line, etc.) with an area extending vertically, the area extending vertically of the other object mark is lesser that an area extending vertically of the frame-like object mark, the vertical component of the displayed object mark is not obvious. Moreover, in the following description, the object B is an object that has a lower risk degree than the object A and the object B does not need to be drawn attention compared to the object A.

The subject detecting sensor 10 is a sensor to detect the object A and the object B in the surrounding area of the vehicle 100, for example, the subject detecting sensor 10 detects the object A and the object B by outputting electromagnetic wave to the surrounding area of the vehicle 100 and receiving the electromagnetic wave reflected by the subjects in the surrounding area of the vehicle 100. As the subject detecting sensor 10, it can be a millimeter wave radar, a laser radar, or a camera, etc. Furthermore, instead of the subject detecting sensor 10, the vehicle information display device 1 may receive information from external subjects such as other vehicles or road infrastructures, and detects the object A and the object B from the received information.

An ECU (Electronic Control Unit) 20 that controls the images display in the display area 31, the display area 31 being displayed by the HUD device 30, is connected to the subject detecting sensor 10, and the HUD device 30 is connected to the ECU 20. Information of the object A and the object B detected by the subject detecting sensor 10 is output to the ECU 20. The ECU 20 is configured to include: a attention drawing object extracting portion 21 for extracting the object A that needs to be drawn attention to; a position and size detecting portion 22 for detecting the position and size of the object A; a display position calculating portion 23 for calculating the display position of the object A in the display area 31; an approaching determining portion 24 for determining whether the object A is approaching to the object B; and a display design setting portion 25 for setting the display design, the display design being the first object mark X1 or the second object mark X2, the first object mark X1 and the second object mark X2 being displayed in the display area 31.

The ECU 20 is configured to include CPU and memories such as ROM and RAM, etc., by performing programs using the CPU, the functions of the attention drawing object extracting portion 21, the position and size detecting portion 22, the display position calculating portion 23, the approaching determining portion 24 and the display design setting portion 25 can be achieved. Moreover, functions of the attention drawing object extracting portion 21, the position and size detecting portion 22, the display position calculating portion 23, the approaching determining portion 24 and the display design setting portion 25 may also be achieved by a plurality of ECUs.

The attention drawing object extracting portion 21 extracts the object A, which needs to be drawn attention to, from the object A and the object B in the surrounding area of the vehicle 100, the object A and the object B being detected by the subject detecting sensor 10. The attention drawing object extracting portion 21 acquires information relating to the object from the subject detecting sensor 10, the information including: the type of the object (the type such as the object is a pedestrian or a vehicle, or an adult or a child, etc.), the position of the object (whether the object is on the road that the vehicle 100 travels on, etc.), the moving direction of the object (whether the object moves in a direction towards the vehicle 100, etc.) and a moving speed of the object, etc. Then, the attention drawing object extracting portion 21 extracts the object A using the information relating to the object.

The position and size detecting portion 22 detects the position of the object A with respect to the vehicle 100 and the size of the object A extracted by the attention drawing object extracting portion 21. The display position calculating portion 23, for example, changes the position of the object A extracted by the attention drawing object extracting portion 21 to a coordinate of the object A when the position of the object A being projected through the front glass 35, and the display position calculating portion 23 calculates the position of the object A in the display area 31. The approaching determining portion 24 calculates a distance L between the object A and the object B detected by the subject detecting sensor 10, the distance L being a distance in a vehicle width direction in the display area 31, and the approaching determining portion 24 determines whether the object A is approaching to the object B. The approaching determining portion 24, for example, performs the approaching determination by determining whether the distance L is equal to or less than a threshold value Th. Moreover, the threshold value Th is a value used in the approaching determination, stored in the memory of the ECU 20 for example. Furthermore, the value of the threshold value Th can be properly changed.

The display design setting portion 25 selects the first object mark X1 or the second object mark X2 displayed in the display area 31. In the memory of the ECU 20, data of the frame-like first object mark X1 and data of the second object mark X2 are stored, the frame-like first object mark X1 being displayed in the display area 31, surrounding the object A, the emphasizing degree of the vertical component in the second object mark X2 being suppressed in comparison with the emphasizing degree of the vertical component in the first object mark X1. As the second object mark X2, for example, underlines extending in the lateral direction under the object A can be used. The display design setting portion 25 selects the second object mark X2 when the approaching determining portion 24 determines that the object A is approaching to the object B; otherwise, it selects the first object mark X1.

The HUD device 30 displays the first object mark X1 or the second object mark X2 in the display area 31, the first object mark X1 or the second object mark X2 being selected by the display design setting portion 25. That is, the HUD device 30 displays the second object mark X2 in a manner of showing underlines under the object A, when the object A is approaching to the object B; otherwise, it displays the first object mark X1 surrounding the object A. Therefore, the display position calculating portion 23, the approaching determining portion 24, the display design setting portion 25 and the HUD device 30 function as a display portion 40, the display portion 40 displays the first object mark X1 or the second object mark X2 corresponded to an object T in the display area 31. Since the emphatic display of the object T is performed by the display portion 40, it is easy for the driver to view the object T.

Figure 4:
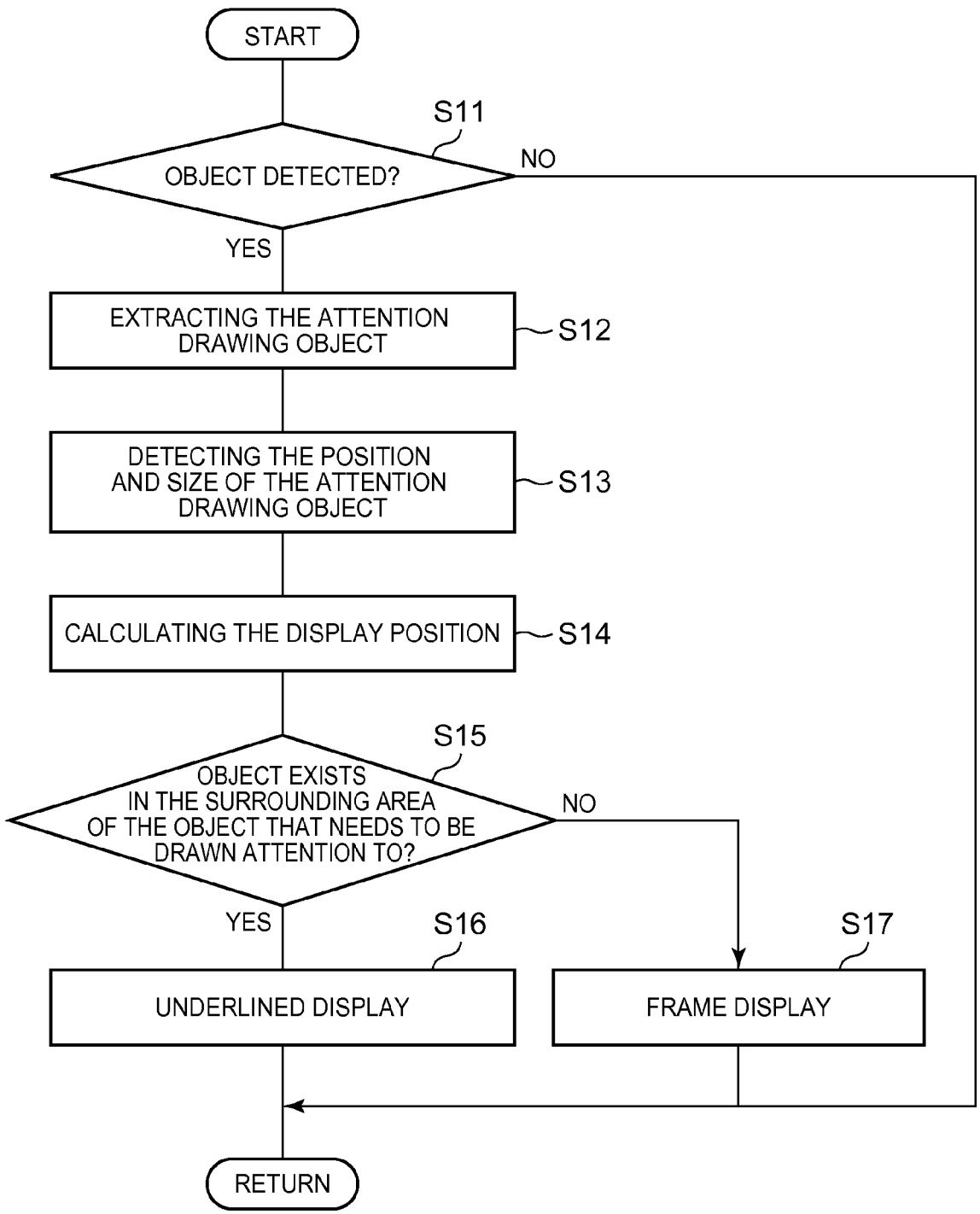
FIG. 4 is a flow chart illustrating the vehicle information display process of the present embodiment.

Next, the vehicle information display method of the present embodiment is described with reference to FIG. 4. The flowchart illustrated by FIG. 4 illustrates the flow of the vehicle information display process performed using the vehicle information display device 1. The vehicle information display process is, for example, repeatedly performed at a certain time interval.

Firstly, in step S11 (hereinafter refers to as "S11", and the other steps are referring to similarly), the subject detecting sensor 10 performs the object detecting process (object detecting step). In S11, the subject detecting sensor 10 detects a plurality of objects such as the object A and object B in the surrounding area of the vehicle 100, and determines whether a plurality of objects exist in the surrounding area of the vehicle 100. When it is determined that there is not a-plurality of objects exist in the surrounding area of the vehicle 100 in S11, the series of process is ended; and when it is determined that there is a plurality of objects exist in the surrounding area of the vehicle 100, it is proceeded to S12.

In S12, the attention drawing object extracting portion 21 performs the attention drawing object extracting process. In S12, one object A as the attention drawing object is extracted, and at least one object in the vicinity of the object A becomes the object B. Then it is proceeded to S13, in which the position and size detecting portion 22 performs the position and size detecting process. In S13, the position of the object A with respect to the vehicle 100 and the size of the object A are detected.

After detecting the position and size of the object A in S13, it is proceeded to S14, in which the display position calculating portion 23 performs display position calculating process. Herein, the display position calculating portion 23 calculates the position and size of the object A in the display area 31, based on the position and size of the object A detected in S13. Then, in S15 to S17, the display portion 40 performs the process of displaying the second object mark X2 as follows: the emphasizing degree of the vertical component of the first object mark X1 when the number of the objects B is large is suppressed in comparison with the emphasizing degree of the vertical component of the first object mark X1 when the number of the objects B is small or no object B is detected. As a specific example, in S15, it is determined whether the object B exists in the vicinity of the object A, and the approaching determining portion 24 determines, for example, whether the distance L between the object A and object B in the display area 31 is equal to or less than the threshold value Th, and whether the object A is approaching to the object B.

Then, when it is determined that the object A is approaching to the object B in the display area 31 in S15, it is proceeded to S16, in which the display portion 40 displays by outputting the second object mark X2 in which the emphasizing degree of the vertical component is suppressed. In S16, the display design setting portion 25 selects the second object mark X2, and the HUD device 30 displays the underlined second object mark X2 in the display area 31 (display step). On the other hand, when it is determined that the object A is not approaching to the object B in the display area 31 in S15, it is proceeded to S17, in which the display portion 40 displays by outputting the first object mark X1 in which the emphasizing degree of the vertical component is not suppressed. In S17, the display design setting portion 25 selects the first object mark X1, and the HUD device 30 displays the frame-like first object mark X1 in the display area 31 (display step). Therefore, after the first object mark X1 or the second object mark X2 is displayed in the display area 31 in S16 or S17, the series of process is ended.

Figure 7:
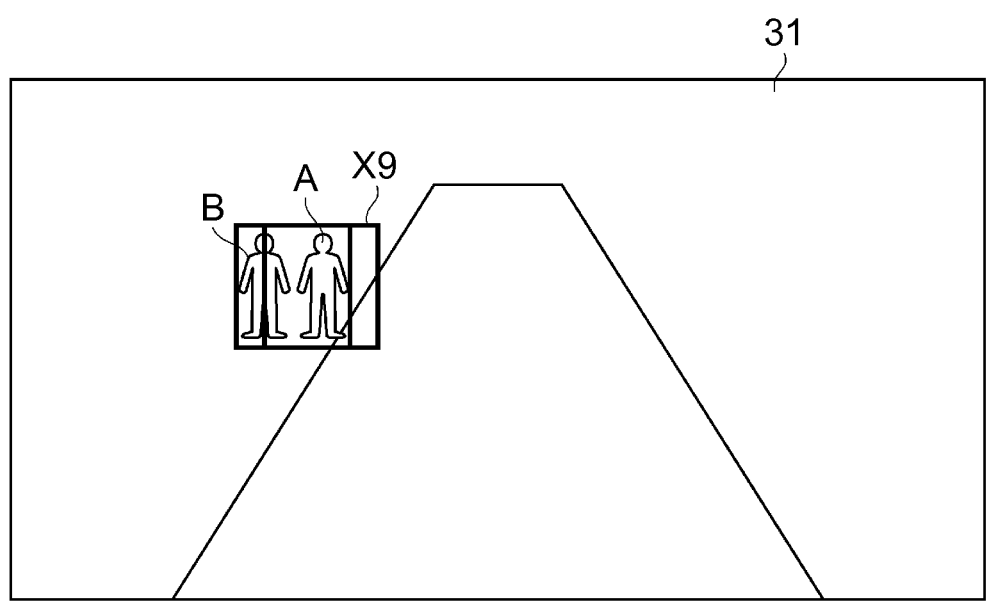
FIG. 7 is a schematic diagram illustrating the display mode of the object mark of the related art.

However, in the vehicle information display device of related art, as illustrated by FIG. 7, when the driver of the vehicle 100 stares at the object A, since the focus point of driver's eyes deviates in the lateral direction, the focus point of driver's eyes being related to the frame-like object mark X9 displayed in the display area 31, thus, the object mark X9 is easily to blur in the lateral direction, and the object mark X9 may interfere with the object B.

In contrast, in the vehicle information display device 1 and the vehicle information display method of the present embodiment, when at least one object B is detected, the second object mark X2 is displayed in the display area 31, the emphasizing degree of the vertical component being suppressed in the second object mark X2; and when no object B is detected, the first object mark X1 is displayed in the display area 31, the emphasizing degree of the vertical component being not suppressed in the first object mark X1. By displaying the second object mark X2 when at least one object B is detected, the interference between the object B and the second object mark X2 can be prevented more reliably. Furthermore, by displaying the first object mark X1 in which the emphasizing degree of the vertical component is not suppressed when no object B is detected, the undesired suppression of the emphasizing degree can be prevented.

Furthermore, in the present embodiment, as illustrated by FIG. 3, when the object B is detected in the vicinity of the object A, the second object mark X2 in which the emphasizing degree of the vertical direction component is suppressed is displayed. Therefore, when the object B exists in the vicinity of the object A and the driver of the vehicle 100 stares at the object A, the correspondence between the second object mark X2 and the object A can be easily recognized by displaying the second object mark X2. Therefore, since the driver can easily recognize the object A using the second object mark X2, even when the object A and the object B exist, the recognition of the object A that needs to be drawn attention to can be easily performed.

Furthermore, as illustrated by FIG. 2, the first object mark X1 is a frame displayed in the display area 31 surrounding the object A. To be more specific, in the present embodiment, the object mark adopts any of the following display modes in the area 31: the first object mark X1 displayed as a frame, surrounding the object A, and the second object mark X2 in which the emphasizing degree of the vertical component of the object mark is suppressed in comparison with that of the first object mark X1. The display portion 40 changes the display mode of the object mark from the first object mark X1 to the second object mark X2, thus the emphasizing degree of the vertical component of the object mark is suppressed. Therefore, when there is no object B, or when the distance L between the object A and object B is far away, since the first object mark X1 is displayed as a frame surrounding the object A, the correspondence between the first object mark X1 and the object A can be easily recognized.

Furthermore, the present invention may include the approaching determining portion 24 that determines whether the object A is approaching to the object B, and when it is determined that the object A is approaching to the object B by the approaching determining portion 24, the display portion 40 displays the second object mark X2 in which the emphasizing degree of the vertical component is suppressed. By providing the approaching determining portion 24 in such a manner, the display design setting portion 25 can select the first object mark X1 or the second object mark X2, according to the distance L between the object A and the object B.

Furthermore, since the display area 31 is provided on the head up display of the vehicle 100, the information relating to the object A is substantially displayed at the sight of the driver. Therefore, since the driver can recognize the object A without moving his or her sight significantly, the timing when the driver notices the existence of the object A can be advanced. And then, the driver can take actions against the object A rapidly (such as deceleration, steering, etc.).

Moreover, the vehicle information display device and the vehicle information display method of one aspect of the present invention are not limited to the above embodiment. The vehicle information display device and the vehicle information display method of one aspect of the present invention may modify the vehicle information display device and the vehicle information display method of the present embodiment without deviating from the content recited in the claims, or may be applied to other embodiments.

For example, in the flow chart illustrated by FIG. 4, when it is determined that the object A is approaching to the object B in the display area 31 in S15, the underlined second object mark X2 is selected; and when it is determined that the object A is not approaching to the object B in the display area 31 in S15, the frame-like first object mark X1 is selected. However, the condition of selecting the object mark is not limited to the distance between the object A and the object B, various kinds of conditions can be used. To be more specific, the object mark may also be selected according to the number of the object B in the vicinity of the object A.

FIG. 8 is a flow chart illustrating the vehicle information display method of the modified embodiment. Since the processes from S21 to S25 are identical with the processes from S11 to S15 illustrated by FIG. 4, the detailed description is emitted. In S26, the approaching determining portion 24 determines the number of the object B in the vicinity of the object A. Then, it is proceeded to S27, in which the approaching determining portion 24 determines whether the number of the object B in the vicinity of the object A is equal to or more than the predetermined threshold value Tb. Herein, the so-called predetermined threshold value Tb, means the number of the object B that is the criterion for selecting the first object mark X1 or the second object mark X2. The threshold value Tb, for example, may be a predetermined fixed value, or a variable value changed according to a predetermined rule.

When it is determined that the number of the object B is equal to or more than the threshold value Tb in S27, it is proceeded to S28 and the underlined second object mark X2 is displayed. On the other hand, when it is determined that the number of the object B is below the threshold value Tb in S27, it is proceeded to S29 and the frame-like first object mark X1 is displayed. Therefore, after displaying the first object mark X1 or the second object mark X2, a series of process is ended.

As aforesaid, the vehicle information display device displays the second object mark X2 as follows: the emphasizing degree of the vertical component of the first object mark X1 when the number of the object B is large is suppressed in comparison with the emphasizing degree of the vertical component of the first object mark X1 when the number of the objects B is small or no object B is detected. Herein, the so-called the number of the object B is large means the number of the object B is equal to or more than the threshold value Tb, and the so-called the number of the objects B is small or no object B is detected means the number of the object B is below the threshold value Tb.

That is to say, the display portion 40 displays the object mark so that the emphasizing degree of the vertical component of the object mark when the number of the object B is equal to or more than the threshold value Tb is suppressed in comparison with the emphasizing degree of the vertical component of the object mark when number of the object B is below the threshold value Tb. Herein, to be more specific, when the number of the object B is equal to or more than the threshold value Tb, the display portion 40 displays the second object mark X2 in which the emphasizing degree of the vertical component is suppressed in the display area 31; on the other hand, when the number of the object B is below the threshold value Tb, the display portion 40 displays the first object mark X1 in which the emphasizing degree of the vertical component is not suppressed in the display area 31.

Therefore, when the number of the object B is equal to or more than the threshold value Tb, the second object mark X2 in which the emphasizing degree of the vertical component is suppressed is displayed, the vertical component of the object mark that makes the object mark and the object B easily interfere with each other is suppressed, so that the interference between the object mark and the object B is suppressed. Therefore, a certain correspondence between the object mark and the object A can be ensured. Therefore, even the object B exists, the driver can easily recognize the object A that needs to be drawn attention to using the object mark. On the other hand, when the number of the object B is below the threshold value Tb, the first object mark X1 in which the emphasizing degree of the vertical component is not suppressed is displayed, the undesired suppression of the emphasizing degree can be prevented.

Furthermore, in the above embodiment, the frame-like first object mark X1, and the underlined second object mark X2 in which the emphasizing degree of the vertical component is suppressed in comparison with that of the first object mark X1 are used, but various kinds of object marks can be used to replace the first object mark X1 and the second object mark X2.

Figure 5:
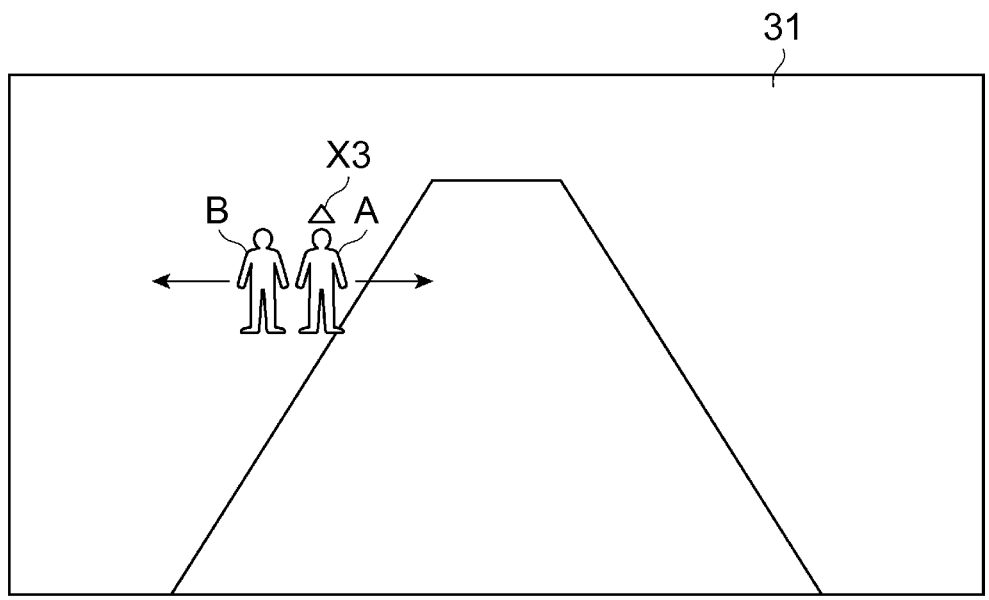
FIG. 5 is a schematic diagram illustrating the modified example of the display mode of the object mark.

As illustrated by FIG. 5, the underlined second object mark X2 may be replaced, and a triangle object mark X3 above the object A is displayed in the display area 31. Also, the triangle object mark X3 can also be replaced, for example, using an over-line extending in the lateral direction above the object A. In other words, the emphasizing degree of the vertical component is suppressed in comparison with that of the first object mark X1.

Furthermore, in the above embodiment, the display portion 40 suppresses the emphasizing degree of the vertical component of the object mark by switching from the first object mark X1 to the second object mark X2; but the suppression of the emphasizing degree may be performed in other manners. For example, the object mark may be used as a frame displayed in the display area 31 surrounding the object A, and the display portion 40 suppresses the emphasizing degree of the vertical component of the object mark by suppressing the emphasizing degree of a vertical frame portion of the frame.

Figure 6:
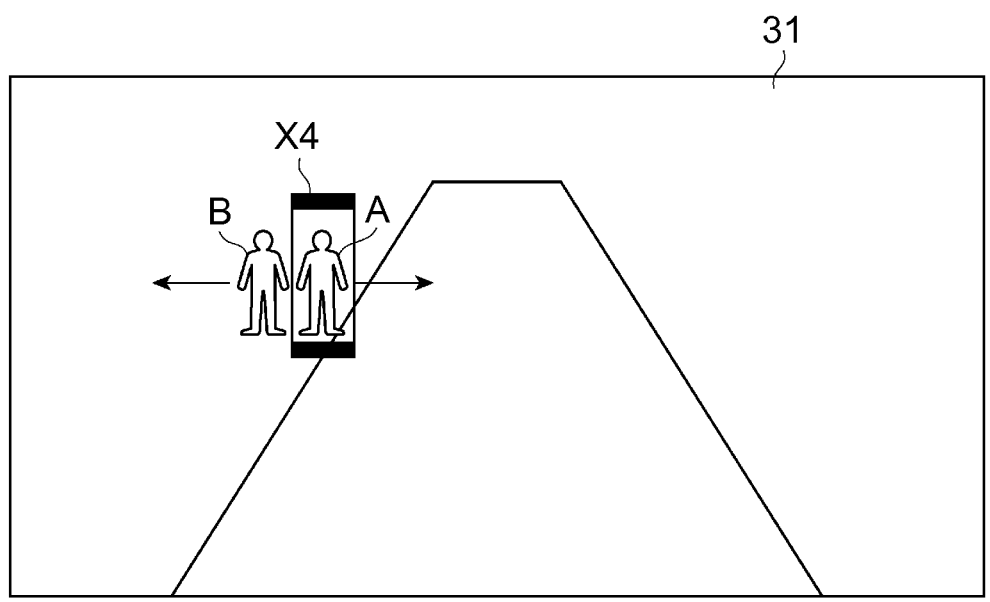
FIG. 6 is a schematic diagram illustrating the other modified example of the display mode of the object mark.

To be more specific, as illustrated by FIG. 6, an object mark X4 that has thinner vertical lines in comparison with that of the first object mark X1, may be displayed in the display area 31. Furthermore, the second object mark X2 can be replaced, by an object mark that has a light color for the vertical lines in comparison with that of the first object mark X1, or an object mark that the has a suppressed brightness for the vertical lines in comparison with that of the first object mark X1, or an object mark that is removed of the vertical lines, or an object mark that makes the color of the vertical lines of the first object mark X1 difficult to be recognized (such as, yellow), or an object mark that has a color that represents low risk (such as, blue), the color being displayed in the vertical lines of the first object mark X1. Therefore, by making the vertical lines of the frame-like first object mark X1 difficult to be recognized, the object mark in which the emphasizing degree of the vertical component is suppressed is displayed in the display area 31, and thus the same technical effect with the above embodiments can be achieved.

Furthermore, in the above embodiment, when the object B exists in the vicinity of the object A, the second object mark X2 is displayed; otherwise, the first object mark X1 is displayed. But the condition to select the first object mark X1 or the second object mark X2 is not limited to the above embodiments. For example, the second object mark X2 may also be displayed when two or a certain number of objects B are detected in the vicinity of the object A; on the other hand, the second object mark X2 is not displayed when the number of the detected object B is below a certain number. Furthermore, the emphasizing degree of the vertical component of the object mark is gradually suppressed along with the increasing of the number of the object B detected in the vicinity of the object A, and on the other hand, the emphasizing degree of the vertical component of the object mark is gradually increased along with the decreasing of the number of the object B detected in the vicinity of the object A.

Furthermore, in the above embodiments, when the approaching determining portion 24 determines that the object A is approaching to the object B, the second object mark X2 is selected; otherwise, the first object mark X1 is selected. However, the approaching determining portion 24 can also be emitted. That is to say, the emphatic display of the vertical component of the object mark may be gradually suppressed along with the decreasing of the distance L between the object A and the object B. Furthermore, for example, the emphatic display of the vertical component may be gradually suppressed when the object A and the object B are detected in certain road environment such as a pedestrian crosswalk; and the emphatic display of the vertical component may be gradually suppressed when the object A and the object B are positioned in a predetermined range of the display area 31.

Furthermore, in the above embodiments, the display area 31 that displays the object mark is provided on the head up display of the vehicle 100, and the display area 31 is provided on the front glass 35, but the positions of the display area that displays the object mark are not limited to this. The position of the display area that displays the object mark is not limited to the front glass 35, it may also be on the outer side or the inner side of the front glass 35, and besides, as the display area, other devices besides the head up display can be used.

That is to say, the HUD device 30 may also be replaced, for example, using an electronic terminal device that can be brought into the vehicle 100 as the display portion. To be more specific, for example, a device that can be worn on the head can be used as the display portion. In this way, even when the device that can be wore on the head is used as the display portion, since the object mark in which the vertical direction emphasizing degree is suppressed is displayed on the lens of the glasses when a large number of object B is detected in the vicinity of the object A, the object A that needs to be drawn attention to can be easily recognized, thus, the same technical effect with the above embodiments can be achieved.

What is claimed is:

1. A vehicle, comprising:
 a sensor configured to detect an object in an area surrounding the vehicle;
 a head-up display provided on a side of a driver's seat of the vehicle and configured to display the object detected by the sensor by overlaying information at a visual field of a driver of the vehicle;
 wherein the head-up display is configured to display, in response to the sensor detecting a first object which is a risk to the vehicle, a first mark corresponding to the first object,
 wherein the head-up display is configured to display the first mark corresponding to the first object and a second mark corresponding to the second object in response to the sensor detecting the first object which is a risk to the vehicle and in response to the sensor detecting a second object equal to or less than a predetermined distance from the first object, the second mark differing from the first mark by at least one from among a color density, a size, and a brightness, and
 wherein the first mark is a frame displayed in a display area surrounding the first object, the head-up display suppresses the emphasizing degree of the vertical component of the first mark by suppressing an emphasizing degree of a vertical frame portion of the frame.

2. The vehicle according to claim 1, wherein
the head-up display is configured to display the first mark so that when a number of the second objects is equal to or greater than a predetermined threshold value, the emphasizing degree of the vertical component of the first mark is suppressed in comparison with the emphasizing degree of the vertical component of the first mark when the number of the second objects is below the predetermined threshold value.

3. The vehicle according to claim 1, wherein
the head-up display is configured to, in response to the first mark being displayed as a frame in a display area surrounding the first object and the second mark in which the emphasizing degree of the vertical component of the second mark being suppressed in comparison with that of the first mark,
the head-up display suppresses the emphasizing degree of the vertical component of the first mark by switching a head-up display mode of the first mark from the first mark to the second mark.

4. The vehicle according to claim 1, wherein
the head-up display suppresses the emphasizing degree of the vertical component of the first mark when a number of the second objects is equal to or greater than the threshold value, and the head-up display does not suppress the emphasizing degree of the vertical component of the first mark when the number of the second objects is below the threshold value.

5. A vehicle, comprising:
a sensor configured to detect an object in an area surrounding the vehicle;
a head-up display provided on a side of a driver's seat of the vehicle and configured to display the object detected by the sensor by overlaying information at a visual field of a driver of the vehicle;
wherein the head-up display is configured to display a first mark corresponding to the first object in response to the sensor detecting a first object which is a risk to the vehicle and in response to the sensor detecting a number of second objects greater than or equal to a predetermined threshold equal to or less than a predetermined distance from the first object,
wherein the head-up display is configured to display the first mark corresponding to the first object a second mark corresponding to the second objects in response to the sensor detecting the first object which is a risk to the vehicle and in response to the sensor detecting a number of second objects less than the predetermined threshold equal to or less than a predetermined distance from the first object, the second mark differing from the first mark by at least one from among a color density, a size, and a brightness, and
wherein the head-up display is configured to display the first mark so that when the number of the second objects is equal to or greater than a predetermined threshold value, the emphasizing degree of the vertical component of the first mark is suppressed in comparison with the emphasizing degree of the vertical component of the first mark when the number of the second objects is below the predetermined threshold value.

6. The vehicle according to claim 5, wherein the risk of the first object to the vehicle is determined using at least one from among a type of an object, a position of the object, a moving direction of the object, and a moving speed of the object.

7. The vehicle according to claim 5, wherein
the head-up display is configured to, in response to the first mark being displayed as a frame in a display area surrounding the first object and the second mark in which the emphasizing degree of the vertical component of the second mark being suppressed in comparison with that of the first mark,
the head-up display suppresses the emphasizing degree of the vertical component of the first mark by switching a head-up display mode of the first mark from the first mark to the second mark.

8. The vehicle according to claim 5, wherein
the first mark is a frame displayed in a display area surrounding the first object,
the head-up display suppresses the emphasizing degree of the vertical component of the first mark by suppressing an emphasizing degree of a vertical frame portion of the frame.

9. The vehicle according to claim 5, wherein
the head-up display suppresses the emphasizing degree of the vertical component of the first mark when the number of the second objects is equal to or greater than the threshold value, and the head-up display does not suppress the emphasizing degree of the vertical component of the object mark when the number of the second objects is below the threshold value.

10. The vehicle according to claim 5, wherein
the head-up display suppresses the emphasizing degree of the vertical component of the first mark when at least one or more second objects is detected, and the head-up display does not suppress the emphasizing degree of the vertical component of the object mark when no second object is detected.

11. The vehicle according to claim 5, wherein the risk of the first object to the vehicle is determined using at least from among a type of an object, a position of the object, a moving direction of the object, and a moving speed of the object.

* * * * *